Nov. 20, 1951 — C. A. DE GIERS ET AL — 2,575,616
TELEMETERING TRANSMITTER WITH TWO PRIME MOVERS
Filed Nov. 15, 1945 — 2 SHEETS—SHEET 1
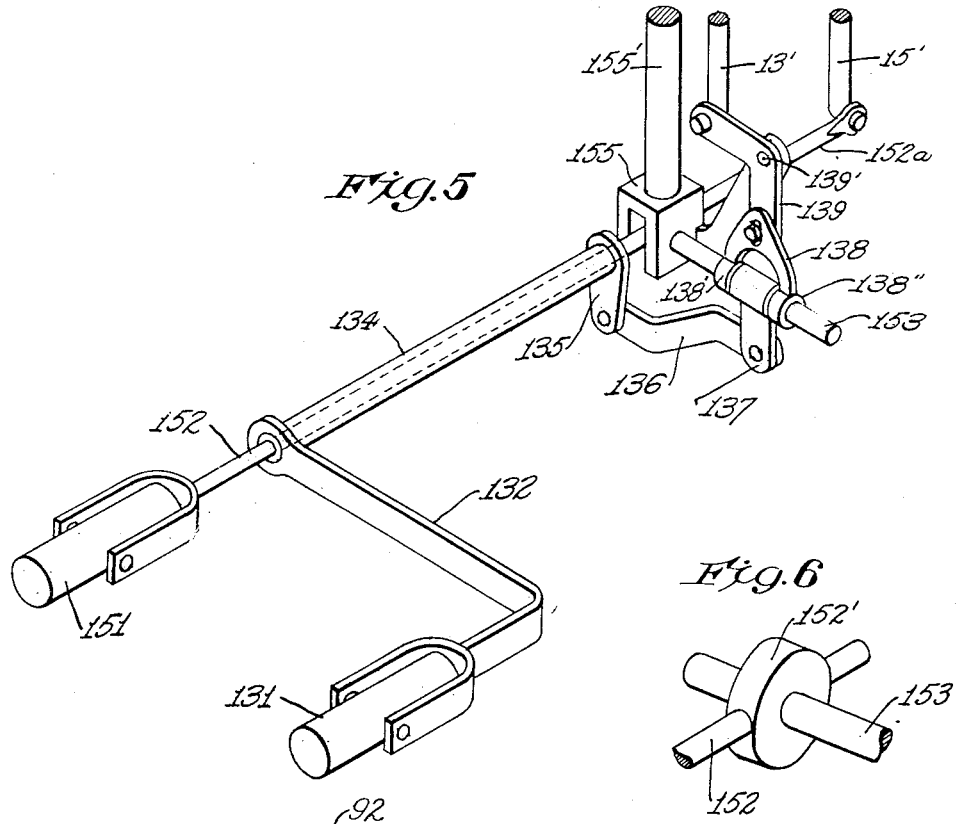
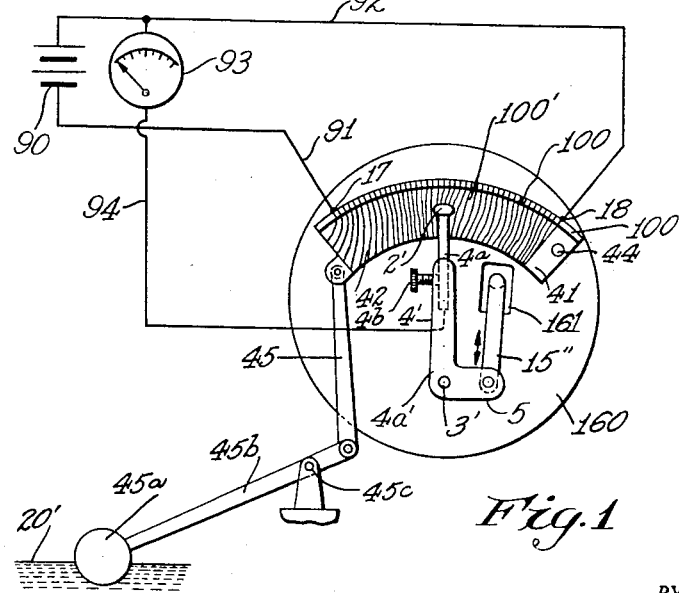
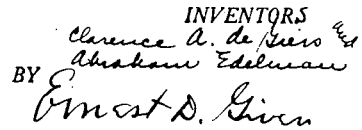
INVENTORS
Clarence A. de Giers
Abraham Edelman
BY Ernest D. Given
ATTORNEY

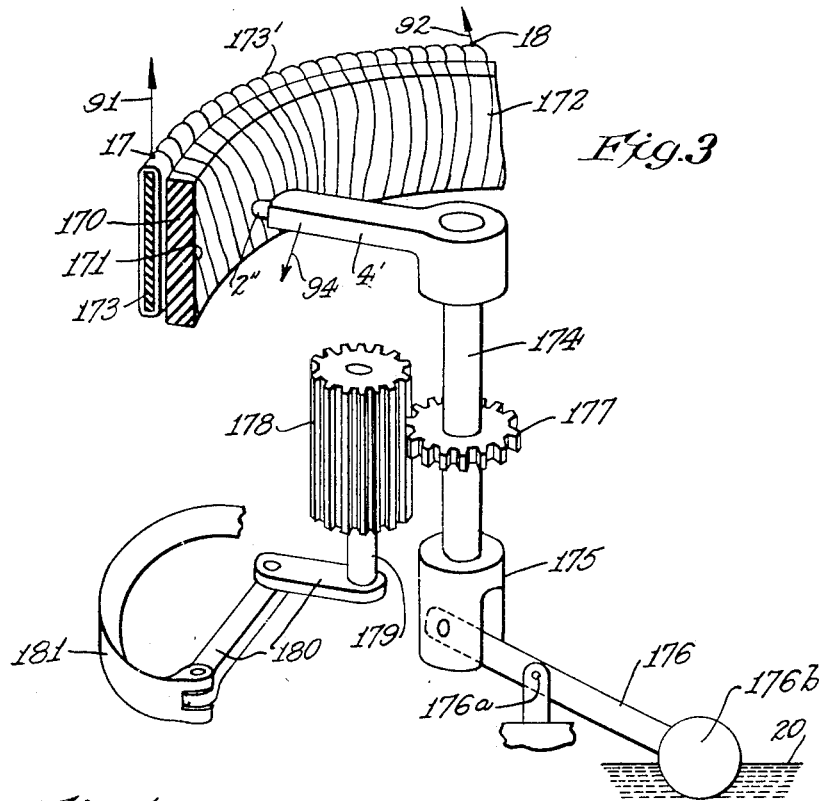
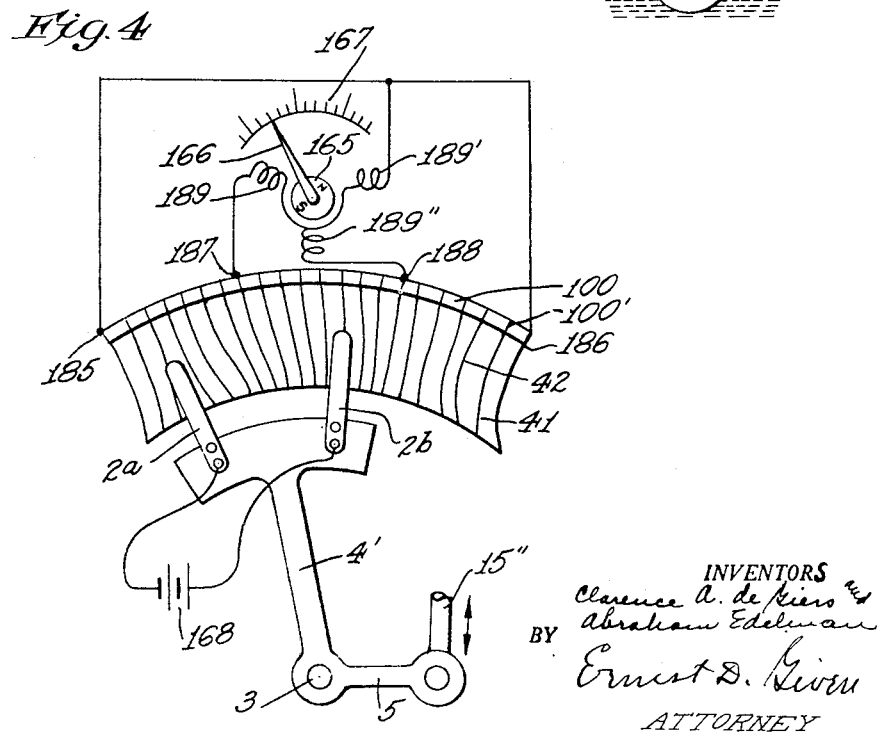

Patented Nov. 20, 1951

2,575,616

UNITED STATES PATENT OFFICE 2,575,616

TELEMETERING TRANSMITTER WITH TWO PRIME MOVERS

Clarence A. de Giers, Forest Hills, and Abraham Edelman, New York, N. Y., assignors to The Liquidometer Corporation, Long Island City, N. Y., a corporation of Delaware Application November 15, 1945, Serial No. 628,844

7 Claims. (Cl. 201—48)

1

This invention relates to measuring devices for transmitting and measuring a variable magnitude, particularly to telemetering devices for measuring the fluid contents of one or more tanks such as the fuel tanks of aircraft.

In measuring or telemetering devices of the type mentioned it is well known in the art to transmit a signal to a remote indicating or control device. However, in certain cases it is difficult or inconvenient to transmit signals which are a correct measure of a magnitude to be supervised, for instance, it is often difficult in practice to measure the total contents of several tanks or the fluid contents of a tank in which the fluid level may change its attitude relative to the tank due to tilting movements of the tank. In such and related cases it is common practice not to measure the magnitude to be supervised directly, but some other magnitude related to the one to be supervised. As a separate operation the measured magnitudes are then employed to determine, for instance, by calculation or by the use of charts, etc. the magnitude to be supervised.

One object of the invention is to provide a means by which two or more measured magnitudes are combined to one resultant magnitude, the value of which is a desired function of the measured magnitudes. The resultant magnitude may be, for instance, a quantity or volume to be supervised.

Another object of the invention is to provide a transmitter including a means adapted to receive signals from two or more independent sources, to combine these signals into a signal which is a function of all received signals, and to transmit this latter signal to a receiving means such as an indicating instrument, thereby obtaining a direct indication of the total magnitude to be measured without requiring additional operations such as calculations and the employment of charts. A means of the type above described may be used, for example, to measure the total contents of several fuel tanks. Each individual signal is then controlled by the fluid contents of one tank and the common signal, which is a function of all received individual signals, is indicative of the total contents of the tanks. In other words, the device operates as a totalizer.

Another object of the invention is to provide a means for measuring the fluid contents of a tank in which the fluid level is subject to changes of its attitude relative to the tank as it is the case, for instance, with aircraft fuel tanks.

Another object of the invention is to provide

2 a means for increasing the accuracy of the measurement of the fluid contents in a tank.

Other and further objects, features and advantages of the invention will be hereinafter set forth and the novel features thereof defined by the appended claims.

According to a now preferred embodiment of the invention, in which the invention is applied to the measurement of the liquid contents of a fuel tank in an airplane, the measuring device according to the invention comprises a float resting on the surface of the liquid to be measured. This float operates a first mechanical train, which in turn operates a transmitter for remote indication such as the slider of a resistance element. As is well known, the float follows the liquid level, but the measurement that is actually intended is liquid volume. As long as the airplane is in its normal horizontal attitude the mechanical train may be designed to provide a uniform change of slider position with liquid volume by taking due consideration of the shape of the tank. However, if the plane rolls a few degrees to one side the liquid will redistribute itself in the tank, and the slider will no longer move accurately in proportion to the liquid volume. The present invention, as will be explained more fully hereinafter, provides a new relationship between the slider and the resistance element, which will automatically replace the first mentioned one when the airplane rolls to one side; and that new relationship will maintain the desired uniform and accurate relationship between slider position and liquid volume.

In the accompanying drawings several now preferred embodiments of the invention are shown by way of illustration and not by way of limitation.

In the drawings:

Fig. 1 is a diagrammatic view of one embodiment of a measuring device according to the invention;

Fig. 2 is a diagrammatic view of a detail of the device according to Fig. 1;

Fig. 3 is a perspective diagrammatic view of another embodiment of a measuring device according to the invention;

Fig. 4 shows a diagrammatic view of a detail of the measuring device which may be used in conjunction with measuring devices such as shown in Figs. 1 and 3;

Fig. 5 is a perspective diagrammatic view of mechanism which may be used to actuate apparatus as shown in Fig. 1; and Fig. 6 is a perspective diagrammatic view of a detail of the apparatus of Fig. 5 on an enlarged scale.

Figs. 1 and 2 show a preferred embodiment of a measuring device according to the invention in which a control bar surface is provided as a controlling member.

Referring now to Figs. 1 and 2 in detail, the measuring device shown in these figures comprises a transmitter of the resistance type. This transmitter may be electrically connected to a suitable indicating instrument, for example, as illustrated and described in the patents to Lingel, No. 2,391,058, issued December 18, 1945, or De Giers, No. 2,469,105, issued May 3, 1949, or in any other suitable manner. The control bar surface forming part of the transmitter comprises an insulating block 41 preferably curved to an arc. The insulating block has a flat surface 43 provided with many curved grooves 42 each inlaid with a metal bar. Associated with one of the peripheral edges of insulating block 41 is an insulating strip 100 supporting a resistance wire 100' wound about insulation strip 100. Each inlaid metal bar of the control bar surface is connected to a tap on the resistance wire 100'. A sliding contact 2' rides on the flat surface 43 and is supported on an arm 4'. Arm 4' is pivotal about fixed pivot 3' and has an extension 5 to which is pivotally connected a link 15". Link 15" can be moved by a suitable prime mover such as a suitable float pivotally connected to link 15" by a suitable mechanical linkage such as that hereinafter described in connection with Figs. 5 and 6. For this purpose all parts of the transmitter may be mounted on a base 160 having a slot or hole 161 through which the actuating linkage for link 15" may be passed.

It will then be apparent that a vertical displacement of link 15" due to a change of the liquid level or other condition, the magnitude of which is to be indicated, will cause a corresponding movement of contact 2' over the control bar surface. The extent of this movement will be a function of the height of the liquid level or the magnitude of such other condition as is to be indicated. The end taps 17, 18 of the resistance wire 100' and contact 2' may be connected to an indicating system as shown in Fig. 1. The resistor 100', and the changes of its resistance values by the position of slider contact 2' are used to control a receiver such as an indicating device. Such indicating device may be of any suitable conventional type. Since the details of the indicating device are not part of the invention, only a very simple but practical indicating device is diagrammatically shown. This indicating device comprises a source of current, for instance, a battery 90, two terminals of which are connected by leads 91, 92 to taps 17, 18 at the ends of resistance wire 100'. A voltmeter type indicating instrument 93 is connected by a lead 94 with slider contact 2' and also to lead 92. As will be apparent, the indications of the instrument 93 will be controlled by the position of the slider contact 2'.

The control bar surface 43 with its curved metal bars has a radial width which is much greater than is needed for contact 2' in a single arcuate traverse over the control bar surface. This additional width provides additional paths for contact 2' which may be used by varying the length of arm 4'. This may be accomplished by making arm 4' in two sections 4a and 4a', the relative position of which can be adjusted and fixed by means of a set screw 4b. When the length of arm 4' or rather the position of contact 2' on the control bar surface is changed, the contact 2' will traverse a new path on the control bar surface. Since the bars of the control bar surface are curved, the same driving movement transmitted from link 15" will result in a different variation of resistance and hence in a different indication of instrument 93. Thus, the actual values of resistance between taps 17 and 18 will vary with the position of slider contact 2' according to a rule which is determined by the curvatures of the commutator bars and altered by changing the length of the arm 4' supporting contact 2'. The curvatures of the bars of the control bar surface is best determined by a series of calibrations, one for each position of float 45a, employing a prototype tank and tilting the same.

Instead of changing the length of the slider contact arm, the position of insulating block 41 relative to the contact 2' may be changed. For this purpose a sliding or rotating movement may be imparted to block 41. In the arrangement shown, one end of block 41 is mounted on base 160 pivotally about a pivot 44. The other end of block 41 is pivotally connected to a link 45 to which a substantially vertical movement is imparted by a prime mover, for instance, a float 45a resting on a liquid level 20' and operatively connected to link 45 by a lever 45b pivoted about a fixed pivot point 45c. It will be obvious that a change of the liquid level 20' will cause a substantially vertical movement of link 45, which in turn will cause a change of the path traversed by contact 2' on the control bar surface when angularly moved by an axial movement of link 15".

As will be understood from the previous explanations, the angular path of traverse of the contact 2' on the control bar surface, whether controlled by a variation of the length of arm 4' or by a changing of the relative position of contact 2' and insulating block 41, or by any suitable means, is now a function of a change of two magnitudes. Hence, the magnitude of the resistance values affecting instrument 93 will be no longer a function of one magnitude to be measured, but of two independent magnitudes.

It is not necessary to design the control bar surface in the flat arcuate form shown in Fig. 1, but any suitable curved shape may be provided. Fig. 3 illustrates a cylindrical form of the control bar surface which is advantageous under certain circumstances.

Referring now to Fig. 3 in detail, this figure shows part of a cylindrical insulating body 170 having a number of grooves 171, each inlaid with a metal bar 172. A correspondingly shaped insulating strip 173 corresponding to strip 100 of Fig. 1 is provided on which is wound a resistance wire 173'. Each inlaid bar 172 is electrically connected with a tap of resistance wire 173'. The end taps 17, 18 of the resistance wire may be connected with a suitable indicating system such as has been shown in Fig. 1 and described in connection therewith. It should be understood that Fig. 3 shows only a fraction of the control bar surface. A contact element 2" corresponding to contact 2' is riding on the control bar surface and is supported by an arm 4' corresponding to arm 4 of Fig. 1. Contact 2" is preferably held against the control bar surface with light pressure, for instance, by a coil spring (not shown) provided inside of arm 4". A shaft 174 supports arm 4". This shaft is mounted so that it can rotate about its axis and also make an axial movement. As will be obvious from the previous explanations, the rotary movement of shaft 174 will cause the contact 2'' to sweep over the control bar surface and the axial movement of the shaft will change the path of travel traversed by contact 2'' during a given rotary movement of shaft 174. Consequently, the position and movements of contact 2'' on the control bar surface will be a function of the axial and rotary movements of shaft 174. Since the metal bars of the control bar surface are curved, the resistance values affecting instrument 93 will also be a function of the two movements of shaft 174; in other words, the magnitude indicated by instrument 93 will be a function of two other magnitudes.

In order to impart to shaft 174 an axial and a rotary movement the lower end of shaft 174 is supported by a thrust bearing cup 175, which is pivotally connected to an arm 176 pivotal about a fixed pivot point 176a and supporting a float 176b resting on a liquid surface such as 20. It will, of course, be understood that any other suitable prime mover responsive to the magnitude of any desired condition may be provided to impart an axial movement to shaft 174.

In order to impart a rotary movement to shaft 174 a pinion 177 is rigidly mounted on shaft 174. This pinion is engaged by an elongated gear 178 to retain engagement between pinion 177 and gear 178 during an axial movement of shaft 174. Gear 178 is supported by a shaft 179 which is operatively connected by a linkage 180 to a Bourdon tube 181. When this tube changes its shape under the influence of any agent, such change will be transmitted as a corresponding rotary movement to shaft 174. The tube 181 is shown as an example of means responsive to the magnitude of a second and possibly independent condition controlling the indication to be made.

In the previously discussed embodiments of the invention a single slider contact has been shown as element controlling the indicating system. However, the operation of certain indicating systems such as ratio meters and D.-C. Selsyn devices may require the use of two or more contact elements controlled by a single arm. Such an arrangement is shown in Fig. 4 which figure should be examined, for instance, in combination with Fig. 1.

In the arrangement according to Fig. 4, arm 4' supports two contact members 2a and 2b which are insulated from each other and preferably 180 degrees electrically apart. The end taps 185, 186 and intermediate taps 187 and 188 of resistance wire 100' are connected to coils 189, 189', 189'' of a ratio meter in a conventional manner. The rotor 165 of the ratio meter supports a pointer 166 coacting with a suitable calibrated scale 167. The two terminals of a battery 168 are connected with contact elements 2a and 2b. Insulating block 41 supporting metal bars 42 corresponds to insulation block 41 and metal bars 42 of Fig. 1 as is indicated by employing the same reference characters. Similarly, insulation bar 41 of Fig. 4 may, if desired, be pivoted about a pivot corresponding to the pivot 44, Fig. 1, and be actuated by a suitable linkage responsive to the magnitude of a second condition, such as shown in Fig. 1.

As will be obvious, the indications of the ratio meter will be controlled by the path of travel of both contact elements on the control bar surface. This path of travel may be made a function of two magnitudes, as has been described in connection with Fig. 1 and also in connection with Fig. 3 as aforesaid.

Fig. 5 shows a mechanical arrangement which is particularly designed for measuring the contents of a tank which is subject to movements causing a change of attitude of the liquid level relative to the tank. The tank itself is not shown for the sake of clarity of illustration. The arrangement according to Fig. 5 should be examined together with Fig. 1. The driving links 45 and 15'' shown in Fig. 1 correspond to the links designated 13' and 15' of Fig. 5. In other words, the movement of the links 13' and 15' of Fig. 5 will control the movements of a transmitter as shown in Fig. 1, which in turn will be effective to control the indication of a remotely positioned indicator. Any suitable mechanical linkage system may be provided to connect links 13' and 15' to the mechanism disclosed in Fig. 1, including the links 45 and 15'' respectively.

Referring now in detail to Fig. 5, the arrangement for the control of the movements of links 13' and 15' as shown in the figure comprises a float 151 resting on the surface of a liquid in a tank, the contents of which are to be measured. The float 151 is supported by an arm 152 and controls the position of the arm. The arm 152, which is fixed in a cylindrical member 152' (Fig. 6) secured on a pivot shaft 153, has an extension 152a, which is pivotally connected to the driving link 15'. The pivot shaft 153 is mounted for rotation in a stationary bearing 155 which is rigidly carried by a support 155', in turn secured to a suitable stationary structure, for instance, to the structure of the tank. It should, of course, be understood that any other suitable fixed bearing support for the pivot shaft 153 may be provided. Longitudinal movement of the shaft 153 is prevented by the bifurcated form of the bearing 155 embracing the member 152'. The measuring device also comprises a second float 131 resting on the same liquid surface as the float 151 and supported by a bent arm 132. The arm 132 is fastened to a tube 134, through which the arm or rod 152 is passed, so that the tube 134 and the arm 132 may freely rotate when the position of the float 131 and, with it, the position of the arm 132 relative to the arm 152, is changed. Collars or other stops (not shown) on the arm 152 may be provided to prevent axial movement of the tube 134 relative to the arm or rod 152. The tube 134 and the rod 152 are illustrated as being concentrically arranged. The inner end of the tube 134 is rigidly fastened to an arm 135 to which is pivotally connected a link 136, which in turn is pivoted to a member 137 pivotally supported by the pivot shaft 153. The pivot shaft 153 further supports a member 138 having two extensions or forks 138', 138'' embracing the member 137. The member 138 is pivotally connected to one arm of a bell crank lever 139 pivotally mounted on a fixed pivot point 139' and having its second arm pivoted to the link 13'.

Assuming now that the liquid level, on which both floats 151 and 131 rest, rises or falls without change of attitude; for instance, rises; the float 151 will rise also and cause a pivotal movement of the rod 152 about the axis of the pivot shaft 153. As a result the link 15' will be pulled downward in a substantially vertical direction. This downward movement of the link 15' is proportional to the change in height of the liquid surface and will cause a downward movement of the link 15'', Fig. 1, and a clockwise movement of the arm 4' as has been explained in connection with Fig. 1. The pivotal movement of the rod 152 about the axis of the pivot shaft 153 will also raise or lower the point at which the arm 135 is fastened to the tube 134. This movement of the connecting point will be transmitted to the member or collar 137 through the link 136 and effect an angular movement of the collar 137 about the axis of the pivot shaft 153, but will not cause any axial movement of the collar. This solely angular movement of collar 137 will have no effect upon the axial position of collar 138; in other words, the displacement of the connecting point between the tube 134 and the arm 135 will be absorbed by the rotary movement of the collar 137.

The change of the liquid level will also cause a rise or fall of the float 131. However, this change in position of the float 131 and of the linkage connected therewith will not influence the position of link 15', this link being controlled solely by the float 151. Movements of the float 131 with the float 151 will also not affect the position of the link 13' controlled by the float 131 as long as the liquid surface does not change its attitude. As will be apparent from an examination of the drawings, the relative position of the floats 131 and 151 remains unchanged under the conditions previously stated, that is, the float 131 will not rotate its arm 132 about the rod 152 and the member or collar 137 will not change its axial position on the pivot shaft 153. However, if the liquid surface should tilt, the float 131 will move into a horizontal plane different from the horizontal plane of the float 151, thereby causing the arm 132 to revolve around the rod 152. Consequently, the tube 134 and with it the arm 135 will rotate also, thus causing the link 136 to move, which in turn forces the collar 137 to slide axially on the pivot shaft 153. This axial movement of the collar 137 will cause an axial displacement of the member 138, which movement will be transformed into an angular movement of the bell crank 139, causing a corresponding substantially vertical movement of the link 13'. The extent of the axial movement of the link 13' will be controlled by the degree of tilt affecting the float 131.

As previously mentioned, the link 13' may be connected to control the position of the block 41 about the pivot 44 as by connecting the links 13' and 45 or by forming these elements as a single link. Hence there is provided an arrangement by which the value of the resistance of the apparatus of Fig. 1 may be made a function of two magnitudes, namely, the positions of the floats 151 and 131. In the example given, the indication may represent the liquid level at which the floats 151 and 131 are supported, corrected for and hence substantially independent of attitude.

It should be understood that the floats which have been described as prime movers may rest either on a common liquid surface or on liquid surfaces in separate tanks. In the first case, the float arrangement and the measuring device will compensate for the tilt of the liquid surface relative to the tank and in the latter case the measuring device may be calibrated to indicate the total contents of the separate tanks as has been described in detail with Figs. 1 and 5.

While the invention has been described in detail with respect to certain now preferred examples and embodiments of the invention, it will be understood by those skilled in the art after understanding the invention that various changes and modifications may be made without departing from the spirit and scope of the invention, and it is intended, therefore, in the appended claims to cover all such changes and modifications.

What is claimed is:

1. A transmitter for electrically transmitting a magnitude which is a function of two independently variable magnitudes, comprising a resistor, a plurality of conductors respectively electrically connected to spaced points along said resistor and all arranged and disposed in a predetermined surface, an electric contact element movable with respect to said surface and arranged to make electrical contact with said conductors, said conductors being disposed in a pattern such that movement of the contact in one direction modifies the effect of said conductor in relation to one of said variables, and movement of the contact at a substantial angle to said first direction will impose a further effect upon said resistor corresponding to the second variable, means for moving said contact element across said surface in response to one of said two independently variable magnitudes, and means effecting a relative movement between said surface and said contact element in a direction at a substantial angle to the movement aforesaid across said surface in response to the other of said two independently variable magnitudes.

2. A transmitter for electrically transmitting a magnitude which is a function of two independently variable magnitudes, comprising a resistor, a plurality of conductors respectively electrically connected to spaced points along said resistor and all arranged and disposed in a predetermined surface, an electric contact element movable with respect to said surface and arranged to make electrical contact with said conductors, said conductors being disposed in a pattern such that movement of the contact in one direction modifies the effect of said conductor in relation to one of said variables, and movement of the contact at a substantial angle to said first direction will impose a further effect upon said resistor corresponding to the second variable, means operated in response to one of said two independently variable magnitudes for moving said contact element back and forth across said surface, and means operated in response to the other of said two independently variable magnitudes for moving said contact element in respect to said surface in a direction at substantially right angles to the movement thereof by the first named moving means.

3. A transmitter in accordance with claim 1, wherein the first named means for moving said contact element is arranged to move it about a predetermined pivot point in response to said one of said two independently variable magnitudes, and wherein the second named means operating in response to the other of said two independently variable magnitudes is effective to displace said pivot point in accordance with the magnitude of said other of said two independently variable magnitudes.

4. A transmitter in accordance with claim 1, wherein said surface is a cylindrical surface having said conductors arranged on the inside thereof, wherein said electrical contact element is movable about the axis of said cylindrical surface in accordance with the magnitude of said one of said two independently variable magnitudes, and wherein the second named means for operating in response to the other of said two independently variable magnitudes is effective for moving said contact element axially of said axis.

5. A transmitter in accordance with claim 1, wherein said surface is a plane surface.

6. A transmitter in accordance with claim 1, wherein said surface is an arcuate plane surface, wherein said contact element is mounted for movement about a fixed axis substantially concentric with said arcuate surface at a mean position thereof, and wherein the second named means operating in response to said other of said two independently variable magnitudes is connected to rotate said surface about an axis substantially parallel to but spaced from said fixed axis.

7. A transmitter in accordance with claim 1, wherein said electrical contact element includes two spaced, electrically-separate contactors mounted for movement as a unit and arranged simultaneously to make electrical contact with spaced points of said resistor by simultaneously engaging different ones of said conductors.

CLARENCE A. DE GIERS.
ABRAHAM EDELMAN.

REFERENCES CITED

The following references are of record in the file of this patent:

UNITED STATES PATENTS

| Number | Name | Date |
|---|---|---|
| 1,343,003 | Morse | June 8, 1920 |
| 1,707,274 | Morse | Apr. 2, 1929 |
| 1,971,238 | Silling | Aug. 21, 1934 |
| 2,025,774 | Rennick et al. | Dec. 31, 1935 |
| 2,052,481 | Miller | Aug. 25, 1936 |
| 2,070,842 | Reichel et al. | Feb. 16, 1937 |
| 2,148,824 | Lienzen | Feb. 28, 1939 |
| 2,220,951 | Borden | Nov. 12, 1940 |
| 2,319,322 | Hefel | May 18, 1943 |
| 2,346,168 | Jones | Apr. 11, 1944 |
| 2,382,695 | De Giers | Aug. 14, 1945 |
| 2,452,664 | Koenig | Nov. 2, 1948 |
| 2,457,588 | Miller | Dec. 28, 1948 |

FOREIGN PATENTS

| Number | Country | Date |
|---|---|---|
| 369,610 | Germany | Mar. 24, 1923 |
| 447,724 | Germany | Aug. 2, 1927 |